US008855225B2

(12) United States Patent
Malladi

(10) Patent No.: US 8,855,225 B2
(45) Date of Patent: Oct. 7, 2014

(54) FREQUENCY SELECTIVE AND FREQUENCY DIVERSITY TRANSMISSIONS IN A WIRELESS COMMUNICATION SYSTEM

(71) Applicant: QUALCOMM Incorporated, San Diego, CA (US)

(72) Inventor: Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 13/679,194

(22) Filed: Nov. 16, 2012

(65) Prior Publication Data

US 2013/0070724 A1 Mar. 21, 2013

Related U.S. Application Data

(62) Division of application No. 11/777,885, filed on Jul. 13, 2007, now Pat. No. 8,369,424.

(60) Provisional application No. 60/830,770, filed on Jul. 14, 2006.

(51) Int. Cl.
*H04K 1/10* (2006.01)
*H04L 27/28* (2006.01)
*H04B 1/7143* (2011.01)
*H04L 5/00* (2006.01)
*H04W 72/04* (2009.01)
*H04W 72/06* (2009.01)

(52) U.S. Cl.
CPC ......... *H04W 72/0453* (2013.01); *H04B 1/7143* (2013.01); *H04L 5/0062* (2013.01); *H04L 5/0037* (2013.01); *H04L 5/0007* (2013.01); *H04W 72/06* (2013.01)
USPC .......................................... 375/260; 375/259

(58) Field of Classification Search
CPC ............. H04W 72/0453; H04W 72/06; H04L 5/0007; H04L 5/0062; H04L 5/0037; H04B 1/7143
USPC ........................................................ 375/260
See application file for complete search history.

(56) References Cited

U.S. PATENT DOCUMENTS 5,875,184 A * 2/1999 Altvater et al. ............... 370/330
7,221,680 B2 5/2007 Vijayan et al.
(Continued)

FOREIGN PATENT DOCUMENTS

CN          1440609 A      9/2003
CN        101491137 B     10/2013
(Continued)

OTHER PUBLICATIONS

Caire, G et al., "Multiuser Diversity in Delay-Limited Cellular Wideband Systems", International Zurich Seminar on Communications, pp. 178-181 (Feb. 22-24, 2006).
(Continued)

*Primary Examiner* — Erin File
(74) *Attorney, Agent, or Firm* — Peng Zhu

(57) ABSTRACT

Techniques for efficiently supporting frequency selective scheduling (FSS) and frequency diversity scheduling (FDS) are described. In one design, a first transmission for an FSS user may be mapped to a subband selected for this user from among at least one subband in a first frequency region of the system bandwidth. The first transmission may be mapped to a fixed portion or different portions of the selected subband in different time intervals. A second transmission for an FDS user may be mapped across multiple subbands in a second frequency region of the system bandwidth. The second transmission may be mapped to different subbands or different resource blocks in the second frequency region in different time intervals. Each time interval may correspond to a symbol period, a slot, a subframe, etc. The frequency hopping may be performed based on a fixed hopping pattern or a pseudo-random hopping pattern.

23 Claims, 15 Drawing Sheets

(56) References Cited

U.S. PATENT DOCUMENTS

| | | | |
|---|---|---|---|
| 7,366,223 B1* | 4/2008 | Chen et al. | 375/132 |
| 7,587,001 B2 | 9/2009 | Hazani et al. | |
| 2003/0207695 A1* | 11/2003 | Chang et al. | 455/522 |
| 2004/0258134 A1* | 12/2004 | Cho et al. | 375/131 |
| 2005/0058089 A1* | 3/2005 | Vijayan et al. | 370/312 |
| 2005/0096062 A1* | 5/2005 | Ji et al. | 455/450 |
| 2005/0169229 A1* | 8/2005 | Cho et al. | 370/344 |
| 2005/0232135 A1 | 10/2005 | Mukai et al. | |
| 2005/0286467 A1* | 12/2005 | Chang et al. | 370/330 |
| 2006/0002362 A1* | 1/2006 | Subrahmanyam et al. | 370/345 |
| 2006/0209669 A1 | 9/2006 | Nishio | |
| 2006/0215603 A1 | 9/2006 | Nishio et al. | |
| 2007/0041404 A1* | 2/2007 | Palanki et al. | 370/479 |
| 2007/0110104 A1* | 5/2007 | Sartori et al. | 370/480 |
| 2007/0153834 A1* | 7/2007 | Qu et al. | 370/478 |
| 2007/0165568 A1* | 7/2007 | Damnjanovic et al. | 370/329 |
| 2007/0248046 A1* | 10/2007 | Khan | 370/329 |
| 2008/0013599 A1 | 1/2008 | Malladi | |
| 2008/0089286 A1* | 4/2008 | Malladi et al. | 370/330 |
| 2008/0146146 A1* | 6/2008 | Binder et al. | 455/20 |
| 2008/0298339 A1* | 12/2008 | Alamouti et al. | 370/347 |
| 2009/0215450 A1* | 8/2009 | Baldemaier et al. | 455/434 |
| 2009/0303938 A1* | 12/2009 | Kim et al. | 370/329 |
| 2010/0238902 A1* | 9/2010 | Ji et al. | 370/331 |

FOREIGN PATENT DOCUMENTS

| | | |
|---|---|---|
| JP | 2000286822 | 10/2000 |
| JP | 2004312291 A | 11/2004 |
| JP | 2005294895 A | 10/2005 |
| RU | 2154901 | 8/2000 |
| RU | 2207723 C1 | 6/2003 |
| TW | 383522 | 3/2000 |
| WO | 9826526 A1 | 6/1998 |
| WO | 0115355 A1 | 3/2001 |
| WO | 0131941 | 5/2001 |
| WO | 0131942 A1 | 5/2001 |
| WO | 0203627 A2 | 1/2002 |
| WO | 2005020488 A1 | 3/2005 |

OTHER PUBLICATIONS

International Search Report—PCT/US2007/073627—International Search Authority, European Patent Office, Jun. 19, 2008.
Taiwan Search Report—TW096125926—TIPO—Aug. 22, 2011.
Written Opinion—PCT/US2007/073627, International Search Authority, European Patent Office, Jun. 19, 2008.

\* cited by examiner

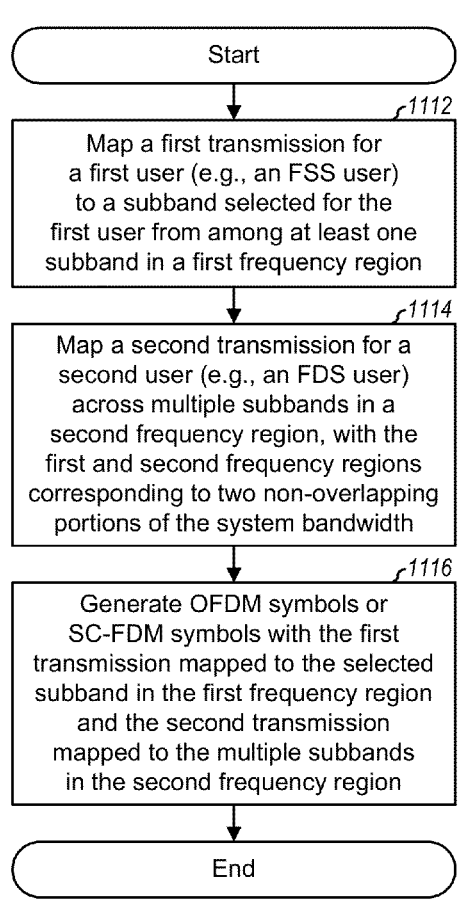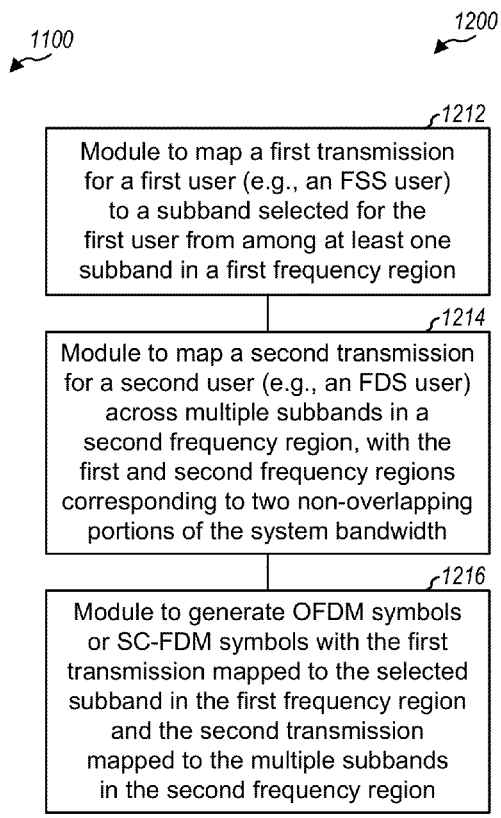
FIG. 11
FIG. 12

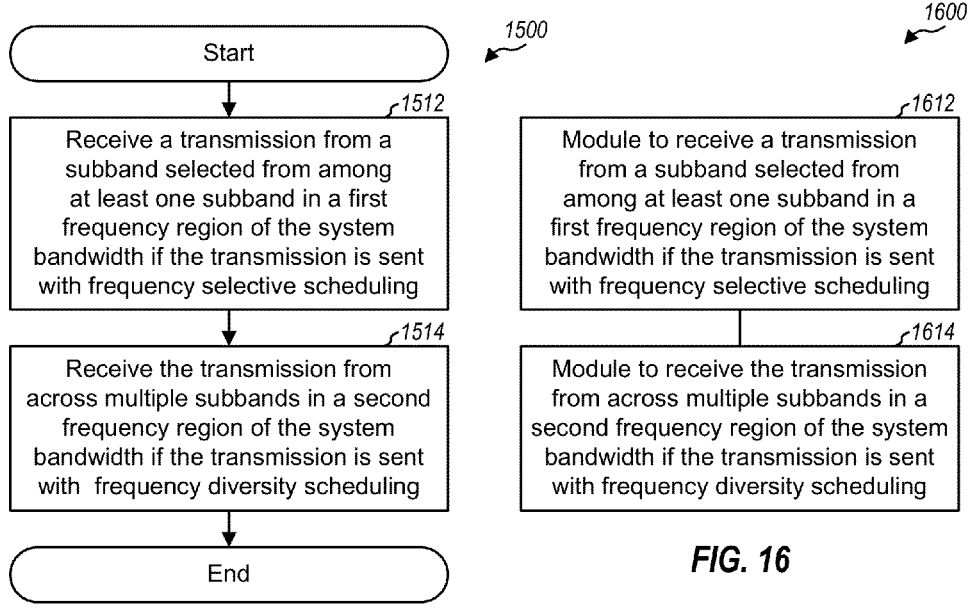

FREQUENCY SELECTIVE AND FREQUENCY DIVERSITY TRANSMISSIONS IN A WIRELESS COMMUNICATION SYSTEM

The present application is a divisional of U.S. application Ser. No. 11/777,885, entitled "FREQUENCY SELECTIVE AND FREQUENCY DIVERSITY TRANSMISSIONS IN A WIRELESS COMMUNICATION SYSTEM," filed Jul. 13, 2007, allowed, which claims priority to provisional U.S. application Ser. No. 60/830,770, entitled "METHOD AND APPARATUS FOR SUBBAND AND DIVERSITY SCHEDULING TECHNIQUES FOR FDMA SYSTEMS," filed Jul. 14, 2006, both assigned to the assignee hereof and incorporated herein by reference.

BACKGROUND

I. Field

The present disclosure relates generally to communication, and more specifically to transmission techniques for a wireless communication system.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a base station may serve many users. These users may observe different channel conditions (e.g., different fading, multipath, and interference effects) and may achieve different received signal-to-noise-and-interference ratios (SINRs). Furthermore, a given user may observe frequency selective fading and may achieve different SINRs across the system bandwidth. It is desirable to support transmissions for different users with different channel conditions such that good performance can be achieved for all of the users.

SUMMARY

Techniques for efficiently supporting frequency selective scheduling (FSS) and frequency diversity scheduling (FDS) are described herein. For FSS, a transmission for a user may be sent on a subband selected for the user from among at least one subband used for FSS. For FDS, a transmission for a user may be sent across multiple subbands used for FDS to achieve channel and interference diversity.

In one design, a first transmission for an FSS user may be mapped to a subband selected for this user from among at least one subband in a first frequency region of the system bandwidth. Each subband may include multiple resource blocks, and each resource block may include multiple subcarriers. The first transmission may be mapped to a fixed portion (e.g., a fixed resource block) of the selected subband in different time intervals. The first transmission may also be mapped to different portions (e.g., different resource blocks) of the selected subband in different time intervals with frequency hopping within the selected subband.

A second transmission for an FDS user may be mapped across multiple subbands in a second frequency region. The first and second frequency regions may correspond to two non-overlapping portions of the system bandwidth. The multiple subbands in the second frequency region may be contiguous or non-contiguous. The second transmission may be mapped to different subbands in the second frequency region in different time intervals with subband level frequency hopping. The second transmission may also be mapped to different resource blocks in the second frequency region in different time intervals with resource block level frequency hopping.

In general, a transmission may be mapped to different sets of subcarriers in one or multiple subbands in different time intervals. A time interval may correspond to a symbol period, a slot, a subframe, etc. The frequency hopping may be performed based on a fixed hopping pattern or a pseudo-random hopping pattern.

Various aspects and features of the disclosure are described in further detail below.

BRIEF DESCRIPTION OF THE DRAWINGS

FIGS. 11 and 12 show a process and an apparatus, respectively, for sending transmissions for FSS and FDS users.
FIG. 15 shows a process for receiving a transmission.
FIG. 16 shows an apparatus for receiving a transmission.

DETAILED DESCRIPTION

Figure 1:
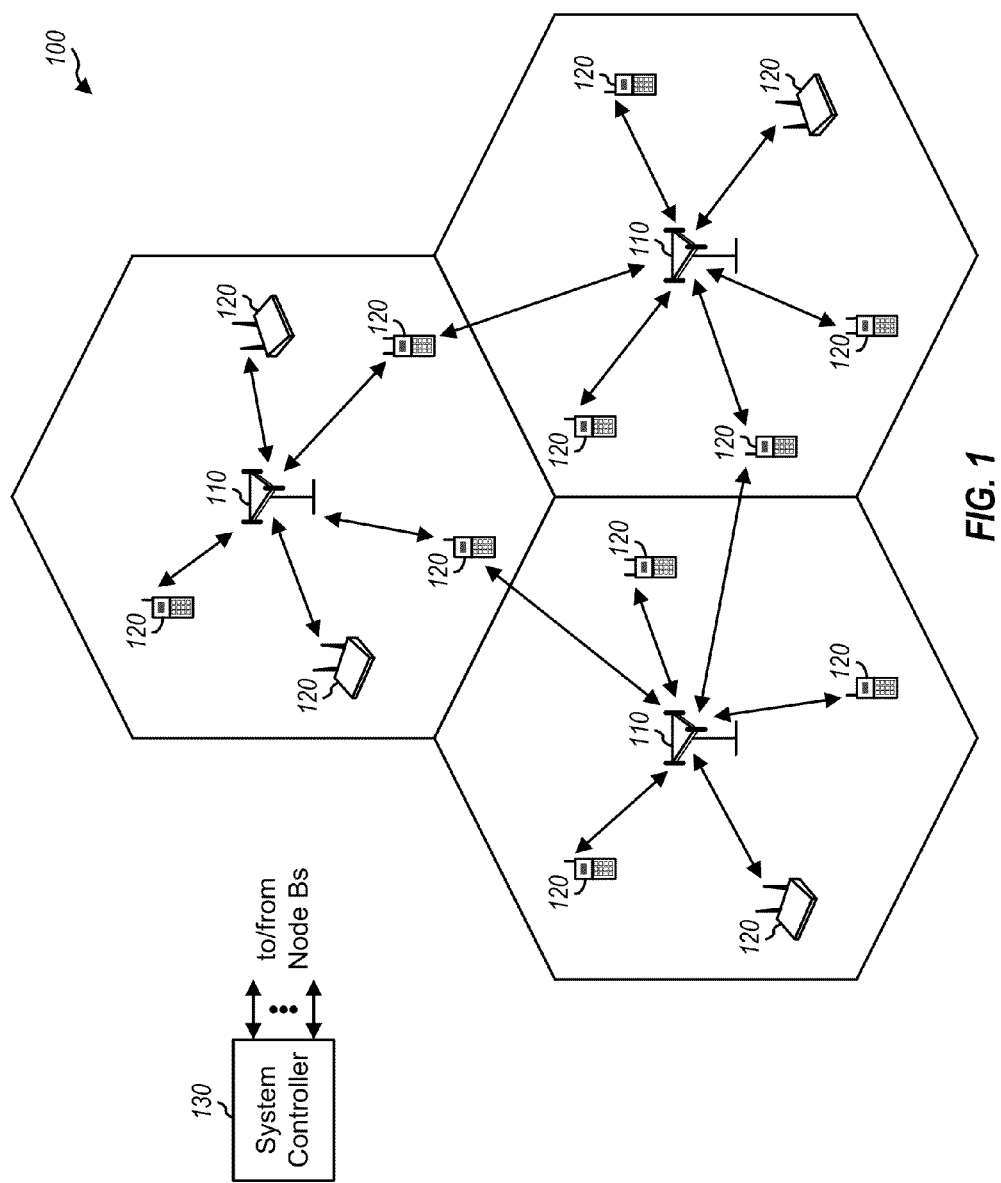
FIG. 1 shows a wireless communication system.

FIG. 1 shows a wireless communication system 100 with multiple Node Bs 110 and multiple UEs 120. A Node B is generally a fixed station that communicates with the UEs and may also be referred to as an evolved Node B (eNode B), a base station, an access point, etc. Each Node B 110 provides communication coverage for a particular geographic area and supports communication for the UEs located within the coverage area. The term "cell" can refer to a Node B and/or its coverage area depending on the context in which the term is used. A system controller 130 may couple to the Node Bs and provide coordination and control for these Node Bs. System controller 130 may be a single network entity or a collection of network entities, e.g., a Mobility Management Entity (MME)/System Architecture Evolution (SAE) Gateway, a Radio Network Controller (RNC), etc.

UEs 120 may be dispersed throughout the system, and each UE may be stationary or mobile. A UE may also be referred to as a mobile station, a mobile equipment, a terminal, an access terminal, a subscriber unit, a station, etc. A UE may be a cellular phone, a personal digital assistant (PDA), a wireless communication device, a handheld device, a wireless modem, a laptop computer, etc. The terms "UE" and "user" are used interchangeably in the following description.

A Node B may transmit data to one or more UEs on the downlink and/or receive data from one or more UEs on the uplink at any given moment. The downlink (or forward link) refers to the communication link from the Node B to the UEs, and the uplink (or reverse link) refers to the communication link from the UEs to the Node B.

The transmission techniques described herein may be used for downlink transmission as well as uplink transmission. The techniques may also be used for various wireless communication systems such as CDMA, TDMA, FDMA, OFDMA, and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (W-CDMA) and Low Chip Rate (LCR). cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), IEEE 802.11, IEEE 802.16, IEEE 802.20, Flash-OFDM®, etc. These various radio technologies and standards are known in the art. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the transmission techniques are described below for LTE, and 3GPP terminology is used in much of the description below.

LTE utilizes orthogonal frequency division multiplexing (OFDM) on the downlink and single-carrier frequency division multiplexing (SC-FDM) on the uplink. OFDM and SC-FDM partition the system bandwidth into multiple (N) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (N) may be dependent on the system bandwidth. In one design, N=512 for a system bandwidth of 5 MHz, N=1024 for a system bandwidth of 10 MHz, and N=2048 for a system bandwidth of 20 MHz. In general, N may be any integer value.

Figure 2:
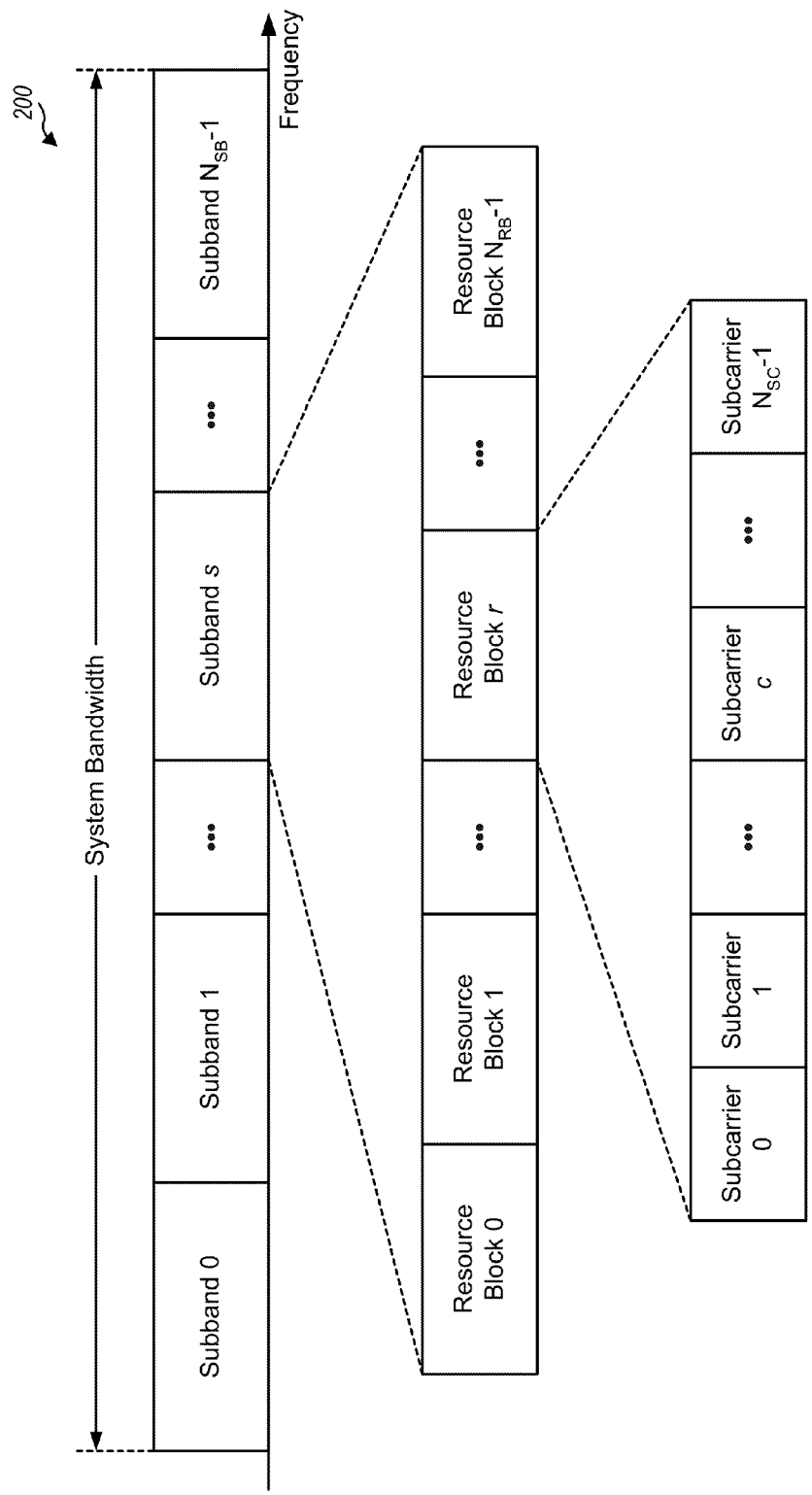
FIG. 2 shows a frequency structure.

FIG. 2 shows a frequency structure 200 that may be used for transmission. The system bandwidth may be partitioned into $N_{SB}$ subbands, each subband may be partitioned into $N_{RB}$ resource blocks, and each resource block may include $N_{SC}$ subcarriers. In general, $N_{SB}$, $N_{RB}$ and $N_{SC}$ may be any integer values. In one design, each resource block includes $N_{SC}$=12 subcarriers. The number of subbands ($N_{SB}$) and the number of resource blocks in each subband ($N_{RB}$) may be dependent on the system bandwidth. In one design, the system bandwidth is partitioned into $N_{SB}$=6 subbands, and each subband includes $N_{RB}$=8 resource blocks. Other values may also be used for $N_{SB}$, $N_{RB}$ and $N_{SC}$ such that $N_{SB} \cdot N_{RB} \cdot N_{SC} \leq N$.

Figure 3:
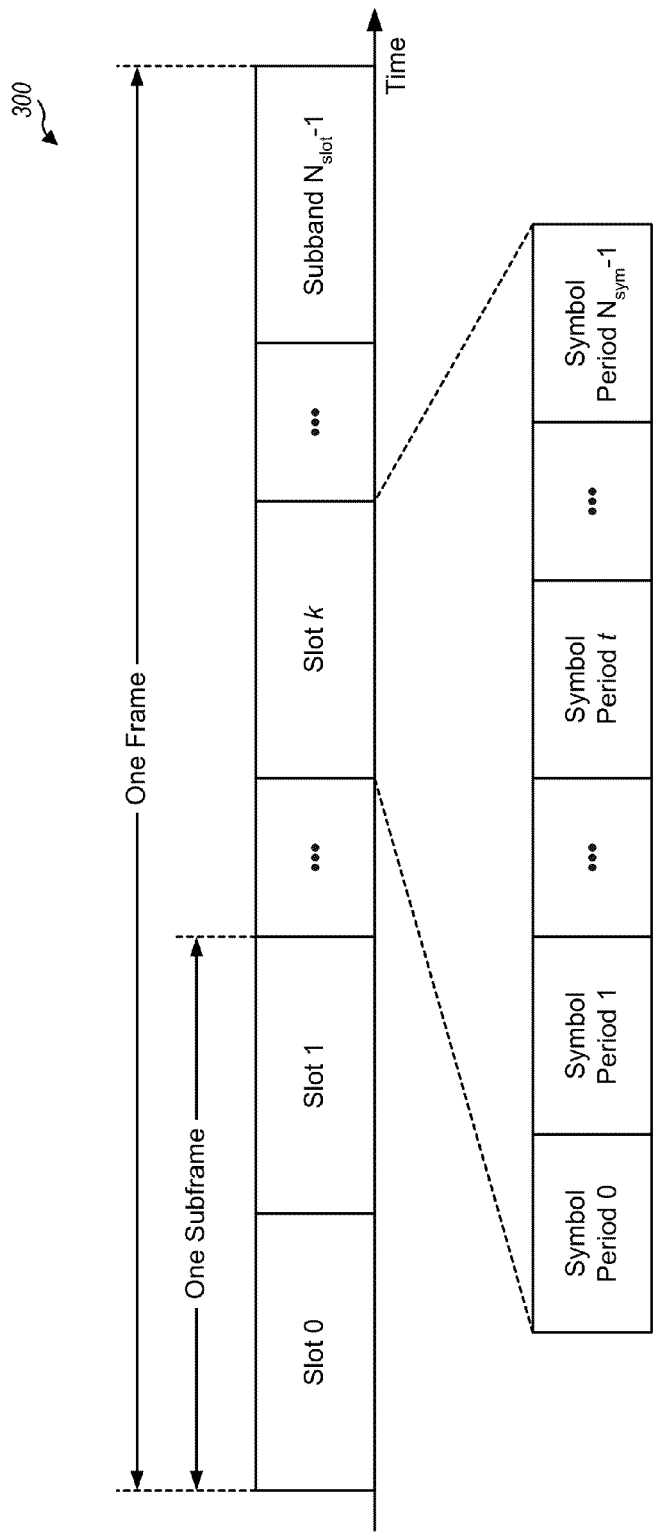
FIG. 3 shows a time structure.

FIG. 3 shows a time structure 300 that may be used for transmission. The transmission timeline may be partitioned into units of frames. Each frame may span a predetermined time duration, e.g., 10 milliseconds (ms). A frame may be partitioned into $N_{slot}$ slots, and each slot may include $N_{sym}$ symbol periods, where $N_{slot}$ and $N_{sym}$ may be any integer values. In one design, each frame includes $N_{slot}$=20 slots, and each slot may include $N_{sym}$=6 or 7 symbol periods. A subframe may include two slots and may also be referred to as a transmission time interval (TTI). In general, each frame may include any number of subframes and slots, and each slot may include any number of symbol periods.

Figure 4:
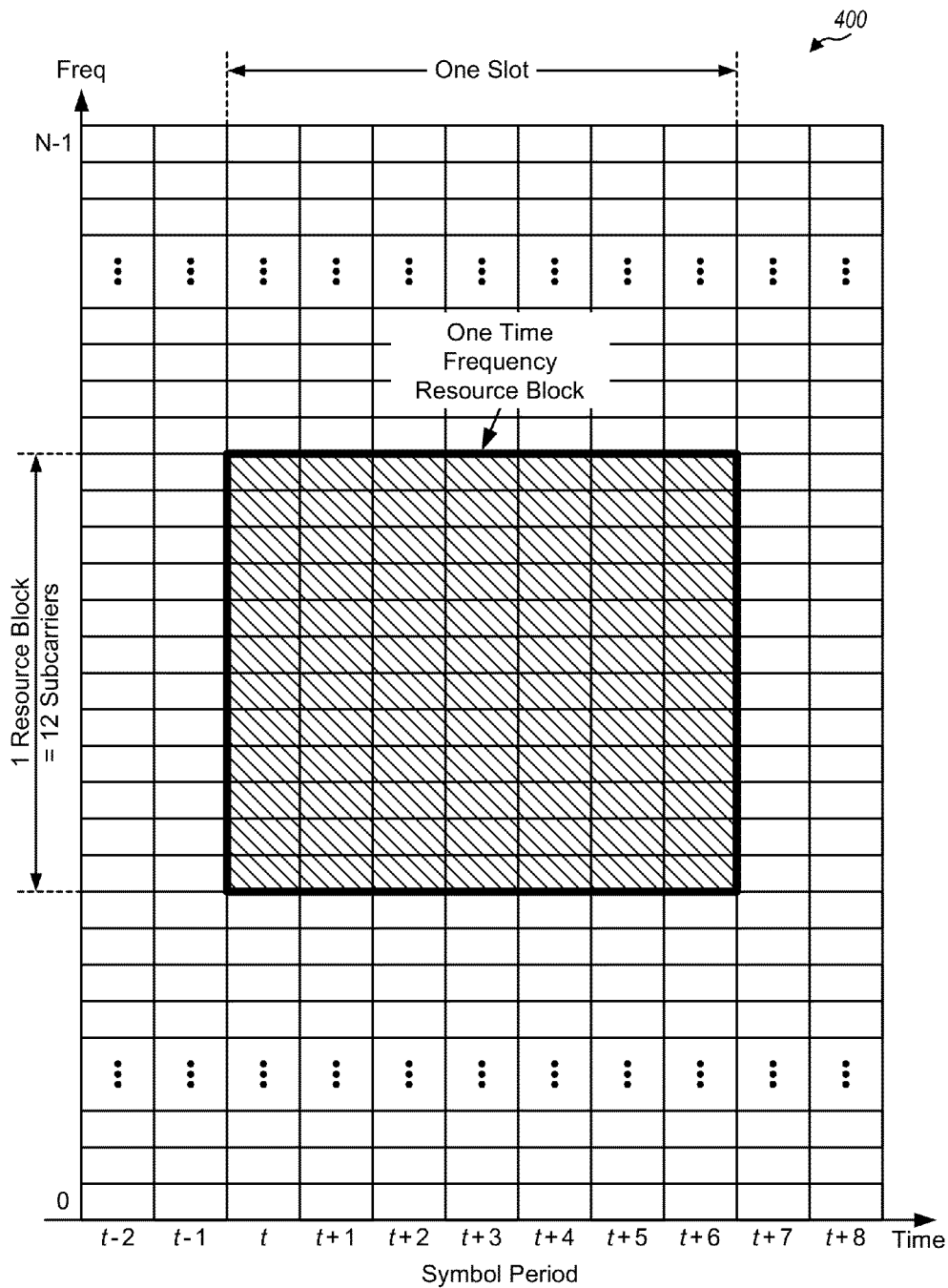
FIG. 4 shows a resource structure.

FIG. 4 shows a resource structure 400 that may be used for transmission. The time frequency resources available for transmission may be partitioned into time frequency resource blocks. A time frequency resource block may be the smallest unit of resources that may be allocated to a user. In general, a time frequency resource block may cover any frequency dimension and span any time duration. In one design, a time frequency resource block covers one resource block in frequency and spans one slot in time. In this design, if a resource block includes 12 consecutive subcarriers, then a time frequency resource block includes 72 resource elements when a slot has six symbol periods and includes 84 resource elements when a slot has seven symbol periods. A resource element is one subcarrier in one symbol period and may be used to send one modulation symbol. In a design that is used in much of the following description, a time frequency resource block covers one resource block in frequency, and the term "resource block" may refer to a set of subcarriers or a block of resource elements. A user may be assigned one or more resource blocks when scheduled for transmission.

The users may be dispersed throughout the system and may observe different channel conditions. For some users, performance may be improved if their transmissions are sent across frequency to achieve both channel and interference diversity. For other users, performance may be improved if their transmissions are sent in certain parts of the system bandwidth with high SINRs.

In an aspect, the system may support the scheduling schemes/types shown in Table 1. Frequency selective scheduling (FSS) may also be referred to as subband scheduling. Frequency diversity scheduling (FDS) may also be referred to as frequency hopped scheduling.

TABLE 1

| Scheduling Type | Description |
| --- | --- |
| Frequency selective scheduling (FSS) | Transmission for a user is sent on subcarriers within a portion of the system bandwidth, e.g., within a selected subband. |
| Frequency diversity scheduling (FDS) | Transmission for a user is sent on subcarriers spanning all or a large portion of the system bandwidth, e.g., in multiple subbands. |

In one design, FDS is achieved with frequency hopping. For frequency hopping, a transmission for a user may be sent in different parts of the system bandwidth in different hop periods. A hop period is an amount of time spent on a given set of subcarriers and may correspond to one symbol period, one slot, one subframe, one frame, etc. Different sets of subcarriers may be selected for the user from among all subcarriers available for FDS based on a hopping pattern that may be known to the user. In one design, FSS is achieved by assigning a user with subcarriers within a selected subband. The selected subband may be the subband that the user achieves the highest SINR among all subbands available for FSS. Frequency hopping may also be used for FSS but may be constrained to the selected subband.

In one design to support both FSS and FDS, the system bandwidth may be partitioned into multiple ($N_{SB}$) subbands, and each subband may be used for either FSS or FDS. Information indicating which subbands are used for FSS and which subbands are used for FDS may be sent on a broadcast channel (BCH) or conveyed in other manners. For example, a subband bit mask may include one bit for each of the $N_{SB}$ subbands. The bit for each subband may be set to 0 to indicate that the subband is used for FDS or to 1 to indicate that the subband is used for FSS.

In one design, an FSS user may be assigned resource blocks in a subband used for FSS. In this design, the FSS user may be constrained to one subband, which may be selected from among all subbands used for FSS. The resource blocks assigned to the FSS user may occupy a fixed set of subcarriers (without frequency hopping) or different sets of subcarriers (with frequency hopping). In one design, an FDS user may be assigned resource blocks in any of the subbands used for FDS. In this design, the FDS user may hop across all subbands used for FDS. The resource blocks assigned to the FDS user may occupy different sets of subcarriers in the subbands used for FDS.

The transmission techniques described herein can efficiently support both FSS and FDS users and may allow both types of users to achieve good performance. Some users may benefit from channel and interference diversity achieved with FDS. Other users may benefit from transmission on specific subbands having good SINRs. The transmission techniques allow both FSS and FDS users to be readily multiplexed within a given time period, e.g., a slot, a subframe, etc. The transmission techniques may be supported with various multiplexing structures, some of which are described below.

Figure 5:
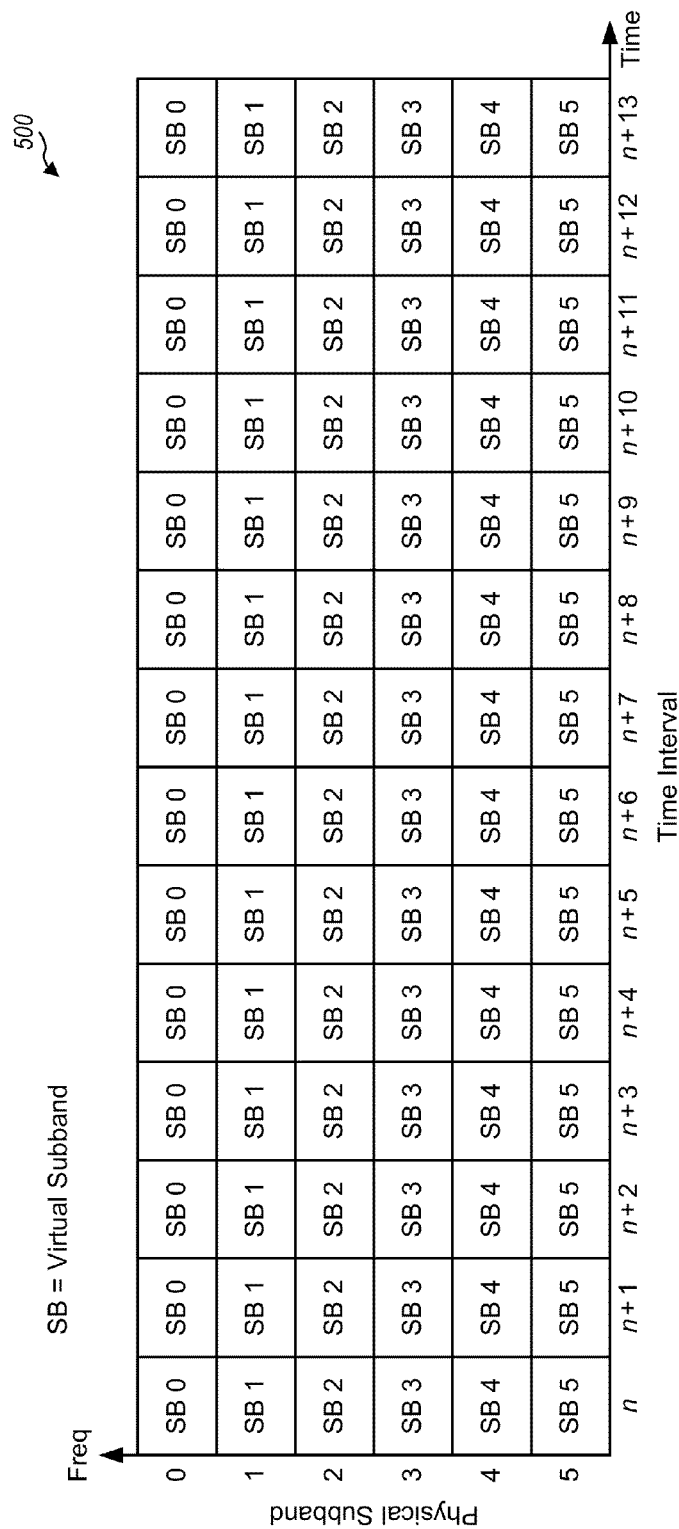
FIG. 5 shows a subband structure.

FIG. 5 shows a design of a subband structure 500. In this design, the system bandwidth is partitioned into $N_{SB}$=6 physical subbands that are assigned indices of 0 through 5. Each physical subband covers a specific portion of the system bandwidth. Six virtual subbands are also defined and assigned indices of 0 through 5. When frequency hopping is not employed, virtual subband s is mapped to physical subband s, and both may be referred to as simply subband s, where s ∈ {0, . . . , 5}. When frequency hopping is employed, virtual subband s may be mapped to different physical subbands in different time intervals. The virtual subbands may simplify the allocation of resources when frequency hopping is employed. In the following description, the term "subband" refers to physical subband unless noted otherwise.

Figure 6A:
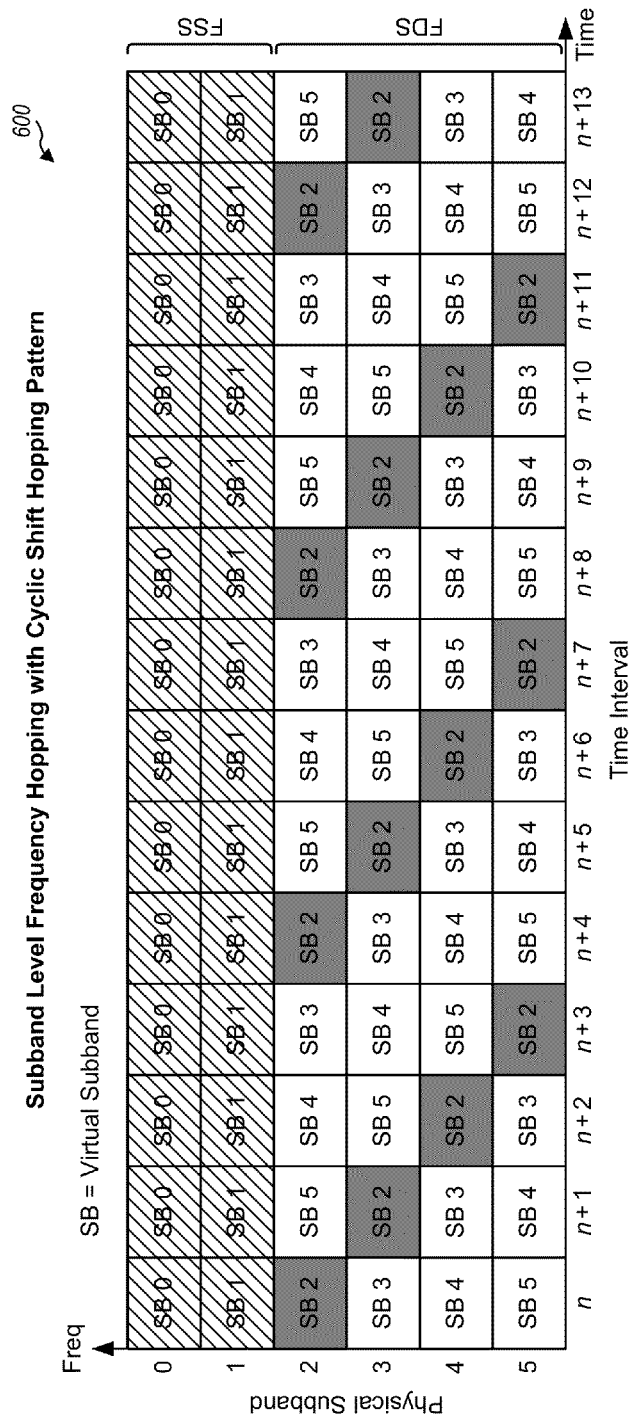
FIGS. 6A and 6B show two multiplexing structures that support both FSS and FDS with frequency hopping across subbands.

FIG. 6A shows a design of a multiplexing structure 600 that supports both FSS and FDS with subband level frequency hopping. In this example design, the system bandwidth is partitioned into $N_{SB}$=6 physical subbands 0 through 5, two physical subbands 0 and 1 are used for FSS, and four physical subbands 2 through 5 are used for FDS. For FSS, the mapping between virtual subbands and physical subbands is static. In the example shown in FIG. 6A, virtual subband 0 is mapped to physical subband 0 in each time interval, and virtual subband 1 is mapped to physical subband 1 in each time interval.

For FDS, each virtual subband may be mapped to any one of the physical subbands used for FDS in each time interval. In the example shown in FIG. 6A, virtual subband 2 is mapped to physical subband 2 in time interval n, to physical subband 3 in time interval n+1, to physical subband 4 in time interval n+2, etc. The mapping of virtual subbands 2 through 5 to physical subbands 2 through 5 in each time interval is shown in FIG. 6A. In the example shown in FIG. 6A, each virtual subband for FDS hops across physical subbands 2 through 5 in a cyclic or circular manner. The mapping of virtual subbands to physical subbands may also be based on other hopping patterns.

Figure 6B:
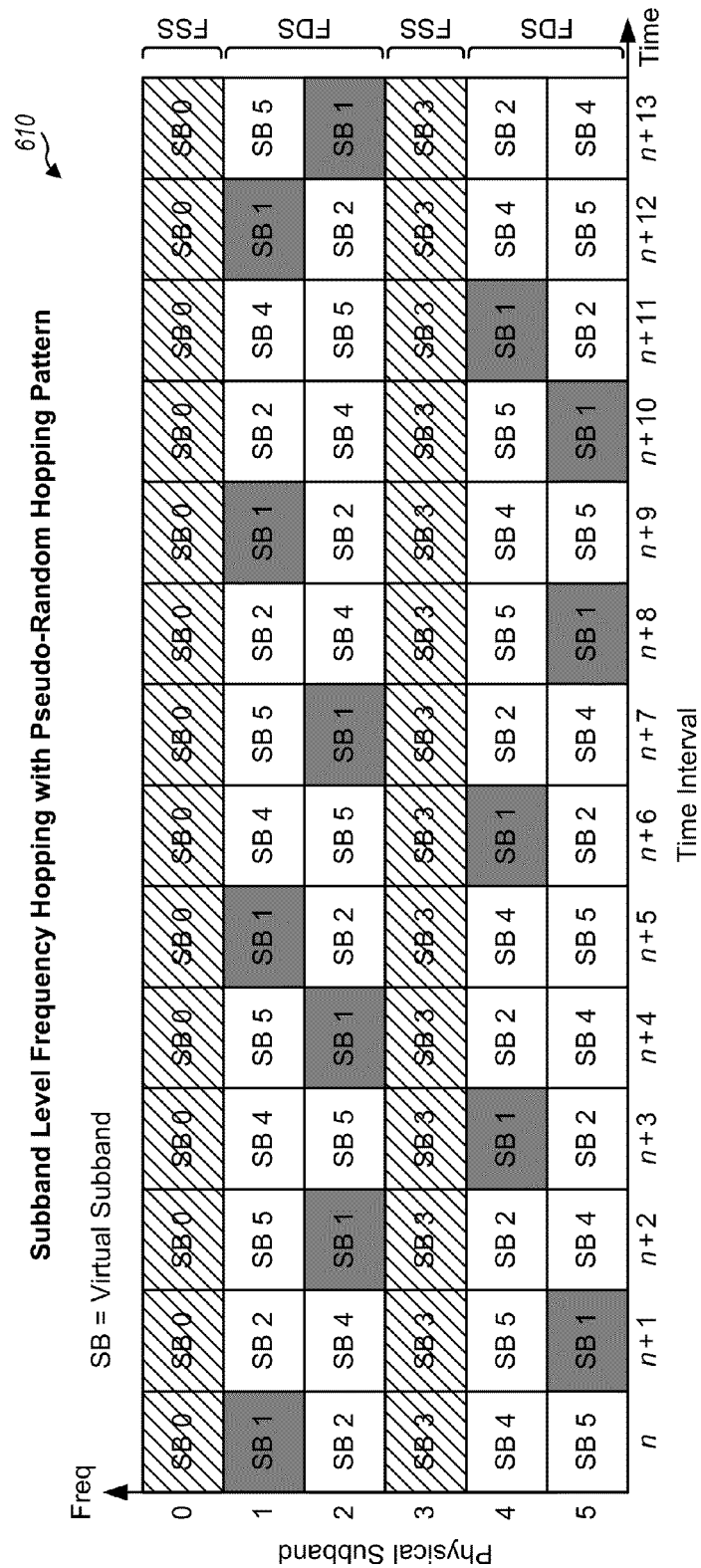

FIG. 6B shows a design of a multiplexing structure 610 that supports both FSS and FDS with subband level frequency hopping. In this example design, the system bandwidth is partitioned into $N_{SB}$=6 physical subbands 0 through 5, two physical subbands 0 and 3 are used for FSS, and four physical subbands 1, 2, 4 and 5 are used for FDS. For FSS, virtual subband s is mapped to physical subband s in each time interval, for s∈{0,3}.

For FDS, each virtual subband may be mapped to any one of the physical subbands used for FDS in each time interval. In the example shown in FIG. 6B, virtual subband 1 is mapped to different ones of physical subbands 1, 2, 4 and 5 in different time intervals based on a pseudo-random hopping pattern. Virtual subbands 2, 4 and 5 are also mapped to physical subbands 1, 2, 4 and 5 based on the same pseudo-random hopping pattern but are cyclically offset by 1, 2 and 3, respectively, from virtual subband 1.

In the example designs shown in FIGS. 6A and 6B, two subbands are used for FSS, and four subbands are used for FDS. In general, any of the $N_{SB}$ subbands may be used for FSS. The subbands used for FSS may be adjacent to one another (e.g., as shown in FIG. 6A) or non-contiguous and possibly distributed across the system bandwidth (e.g., as shown in FIG. 6B). The subbands not used for FSS may be used for FDS. Subband level frequency hopping may be performed across all subbands used for FDS.

An FDS user may be assigned resource blocks in several manners with subband level frequency hopping. Each subband may include $N_{RB}$ resource blocks with indices of 0 through $N_{RB}$-1, as shown n FIG. 2. The FDS user may be assigned a particular resource block r in a particular virtual subband s. With subband level frequency hopping, virtual subband s may be mapped to different physical subbands in different time intervals. In one design, the $N_{RB}$ resource blocks in virtual subband s are mapped to the same resource block locations in each physical subband to which virtual subband s is mapped. For example, the FDS user may be assigned resource block r=3 in virtual subband s=1 in FIG. 6B. This FDS user may then be mapped to resource block 3 in physical subband 1 in time interval n, to resource block 3 in physical subband 5 in time interval n+1, to resource block 3 in physical subband 2 in time interval n+2, etc. The FDS user may be mapped to different physical subbands in different time intervals, but the resource block location within these physical subbands does not change. In another design, the FDS user may be assigned a particular resource block r in a particular virtual subband s, and resource block r in virtual subband s may be mapped to different resource block locations in different physical subbands.

Figure 7:
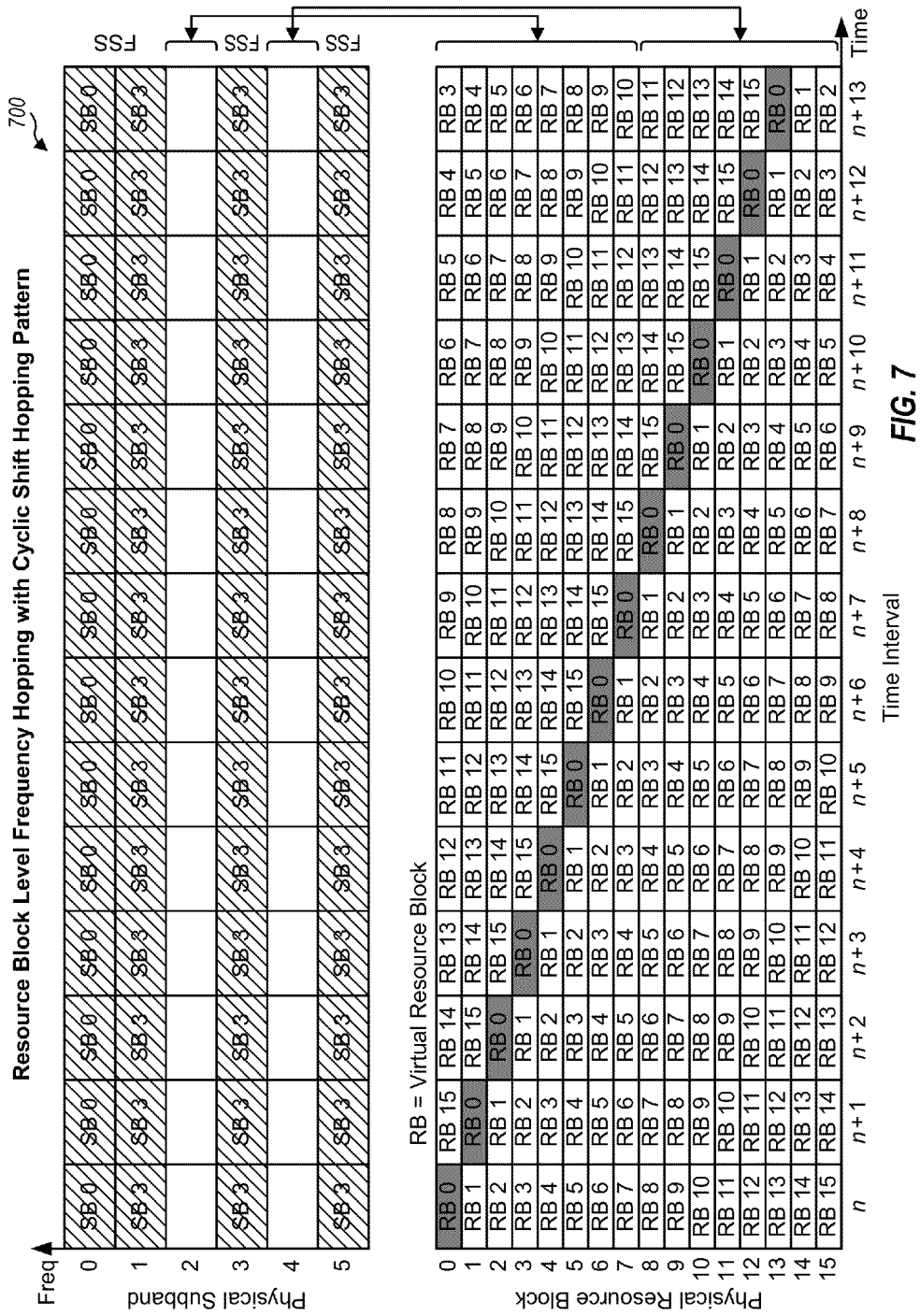
FIG. 7 shows a multiplexing structure that supports both FSS and FDS with frequency hopping across resource blocks.

FIG. 7 shows a design of a multiplexing structure 700 that supports both FSS and FDS with resource block level frequency hopping. In this example design, the system bandwidth is partitioned into $N_{SB}$=6 physical subbands 0 through 5, four physical subbands 0, 1, 3 and 5 are used for FSS, and two physical subbands 2 and 4 are used for FDS. For FSS, the mapping between virtual subbands and physical subbands is static, and virtual subband s is mapped to physical subband s in each time interval, for s∈{0,1,3,5}.

The resource blocks for all physical subbands used for FDS may be aggregated and referred to as physical resource blocks. In the example design shown in FIG. 7, each physical subband includes $N_{RB}$=8 resource blocks, and physical subbands 2 and 4 for FDS include a total of 16 physical resource blocks that are assigned indices of 0 through 15. Sixteen virtual resource blocks may be defined and assigned indices of 0 through 15. The virtual resource blocks may simplify the allocation of resources when frequency hopping is employed.

For FDS, resource block level frequency hopping may be employed, and each virtual resource block may be mapped to any one of the physical resource blocks in each time interval. In the example shown in FIG. 7, virtual resource block 0 is mapped to physical resource block 0 in time interval n, to physical resource block 1 in time interval n+1, to physical resource block 2 in time interval n+2, etc. The mapping of virtual resource blocks 0 through 15 to physical resource blocks 0 through 15 in each time interval is shown in FIG. 7. In the example shown in FIG. 7, each virtual resource block hops across physical resource blocks 0 through 15 in a cyclic manner. The mapping of virtual resource blocks to physical resource blocks may also be based on other hopping patterns.

An FDS user may be assigned a particular virtual resource block r. With resource block level frequency hopping, virtual resource block r may be mapped to different physical resource blocks, which may be in the same or different subbands, in different time intervals.

In the example design shown in FIG. 7, four non-contiguous subbands are used for FSS, and two non-contiguous subbands are used for FDS. In general, any of the $N_{SB}$ subbands may be used for FSS, and the remaining subbands may be used for FDS. Resource block level frequency hopping may be performed across all subbands used for FDS.

Subband level frequency hopping (e.g., as shown in FIGS. 6A and 6B) may have fewer hop locations across the system bandwidth, with the number of hop locations being determined by the number of subbands used for FDS. Resource block level frequency hopping (e.g., as shown in FIG. 7) may have more hop locations across the system, since there may be many more resource blocks than subbands for FDS.

In general, frequency hopping may or may not be employed for FSS. In one design, frequency hopping is not employed for FSS. In this design, an FSS user may be allocated the same resource block in a given subband, and the transmission for this FSS user may be sent in the same part of the system bandwidth. In another design, frequency hopping within a subband is employed for FSS. In this design, an FSS user may be allocated different resource blocks in a given subband, and the transmission for this FSS user may be sent in different parts of this subband.

Figure 8:
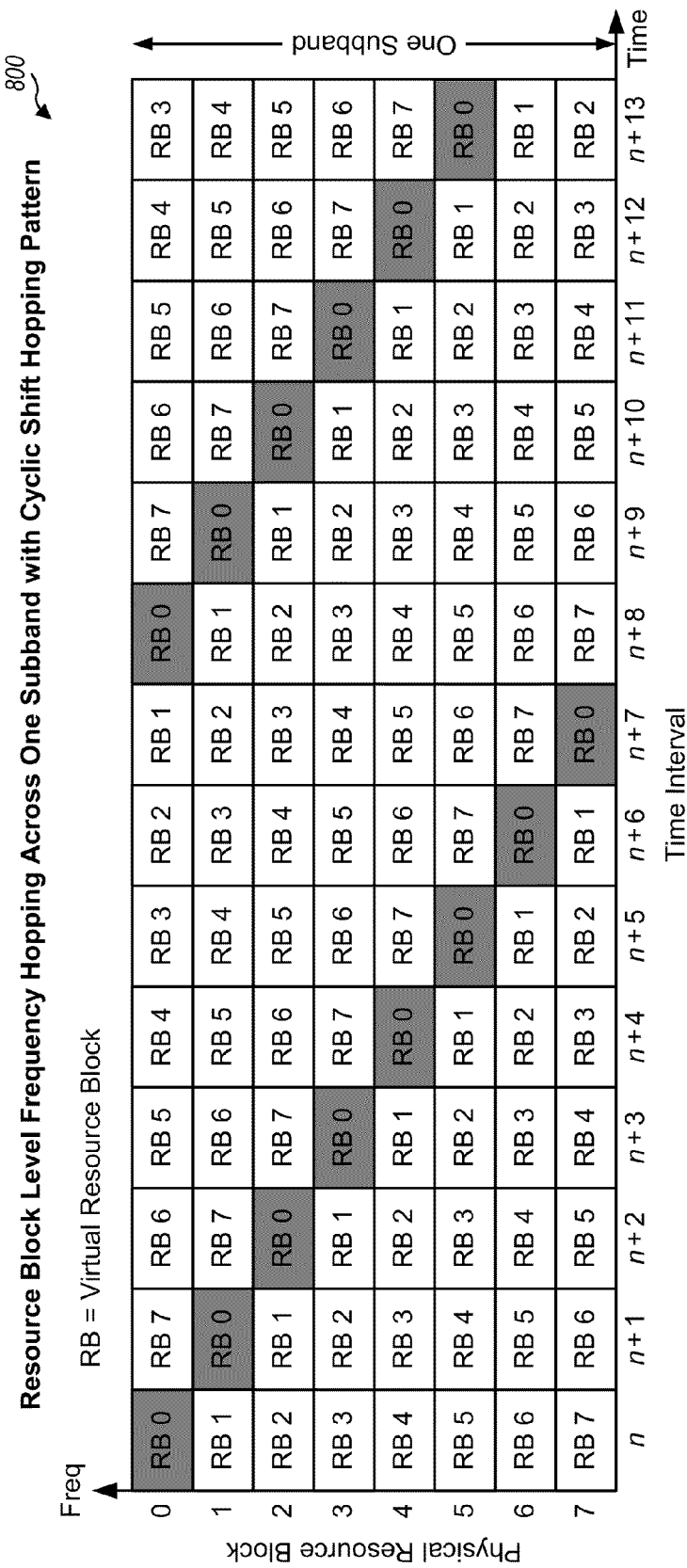
FIG. 8 shows frequency hopping across resource blocks within one subband.

FIG. 8 shows a design of a multiplexing structure 800 that supports FSS with frequency hopping across resource blocks within one subband. In this design, the subband includes $N_{RB}=8$ physical resource blocks that are assigned indices of 0 through 7. Eight virtual resource blocks are also defined and assigned indices of 0 through 7. Each virtual resource block may be mapped to any one of physical resource blocks 0 through 7 in each time interval. In the example shown in FIG. 8, virtual resource block 0 is mapped to physical resource block 0 in time interval n, to physical resource block 1 in time interval n+1, to physical resource block 2 in time interval n+2, etc. The mapping of virtual resource blocks 0 through 7 to physical resource blocks 0 through 7 in each time interval is shown in FIG. 8. FIG. 8 shows a cyclic shift hopping pattern, and other hopping patterns may also be used.

In the example designs shown in FIGS. 6A, 6B and 7, some subbands are used for FSS, and remaining subbands are used for FDS. It may be desirable to allow all or many of the $N_{SB}$ subbands to be used for FSS. Different FSS users may achieve good performance in different subbands. Improved performance (e.g., higher system throughput) may be achieved by scheduling these FSS users on their desired subbands.

Figure 9A:
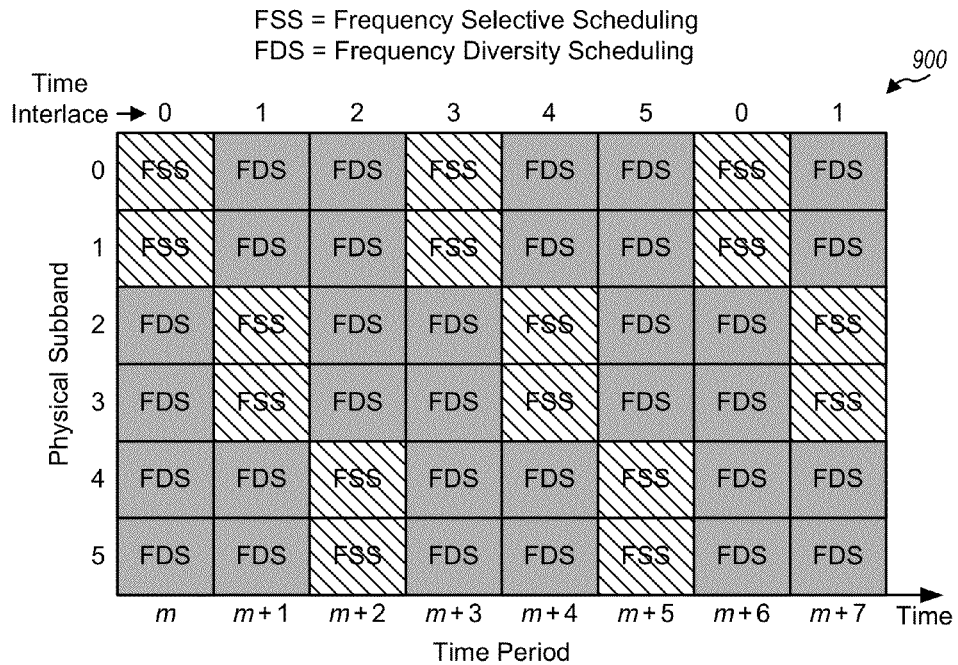
FIGS. 9A and 9B show two multiplexing structures that support both FSS and FDS, with FSS being supported on all subbands.

FIG. 9A shows a design of a multiplexing structure 900 that supports both FSS and FDS, with FSS being supported on all subbands. In this example design, the system bandwidth is partitioned into $N_{SB}=6$ subbands 0 through 5, two subbands are used for FSS, and four subbands are used for FDS in each time period. In general, a time period may correspond to a symbol period, a slot, a subframe, a frame, etc. In this example design, subbands 0 and 1 are used for FSS in time period m, subbands 2 and 3 are used for FSS in time period m+1, subbands 4 and 5 are used for FSS in time period m+2, etc. In each time period, the subbands not used for FSS are used for FDS. Frequency hopping across subbands or resource blocks may be employed for the subbands used for FDS.

Multiple (M) time interlaces may be defined, with each time interlace including time periods that are evenly spaced apart by M time periods. In general, M may be any integer value. In the example design shown in FIG. 9A, M=6 time interlaces 0 through 5 are defined, with time interlace 0 including time periods m, m+6, etc., time interlace 1 including time periods m+1, m+7, and so on, and time interlace 5 including time periods m+5, m+11, etc. In another example design not shown in FIG. 9A, three time interlaces 0 through 2 may be defined, with time interlace 0 including time periods m, m+3, m+6, etc., time interlace 1 including time periods m+1, m+4, etc., and time interlace 2 including time periods m+2, m+5, etc. In any case, regardless of the number of time interlaces, a specific set of or zero or more subbands may be used for FSS in each time interlace. For the example design shown in FIG. 9A, subbands 0 and 1 are used for FSS in time interlace 0, subbands 2 and 3 are used for FSS in time interlace 1, subbands 4 and 5 are used for FSS in time interlace 2, etc. For each time interlace, the subbands not used for FSS may be used for FDS.

Figure 9B:
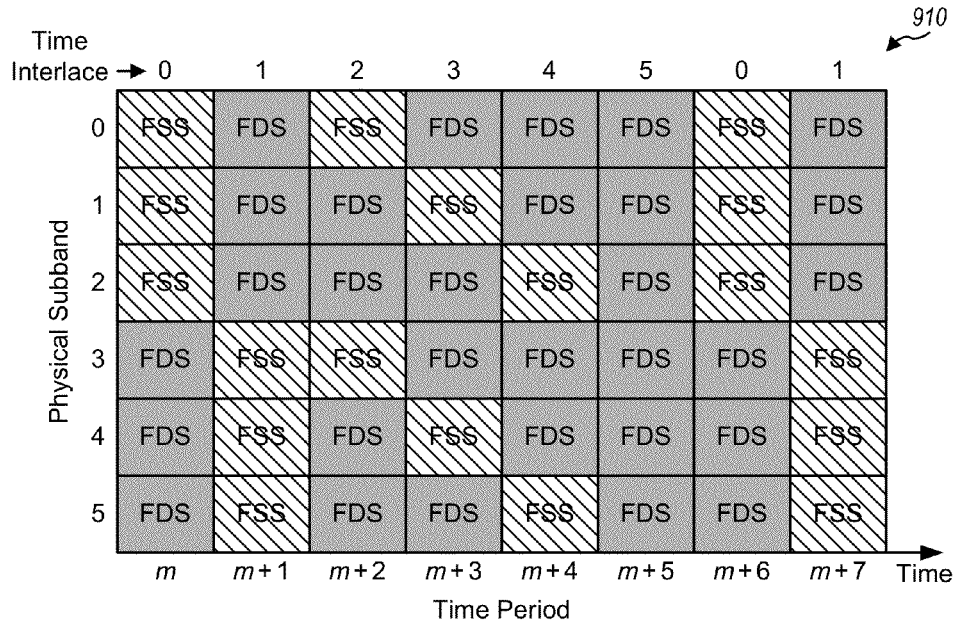

FIG. 9B shows a design of a multiplexing structure 910 that supports both FSS and FDS, with FSS being supported on all subbands. In this example design, the system bandwidth is partitioned into $N_{SB}=6$ subbands 0 through 5, and M=6 time interlaces 0 through 5 are defined. In the example design shown in FIG. 9B, subbands 0, 1 and 2 are used for FSS in time interlace 0, subbands 3, 4 and 5 are used for FSS in time interlace 1, subbands 0 and 3 are used for FSS in time interlace 2, subbands 1 and 4 are used for FSS in time interlace 3, subbands 2 and 5 are used for FSS in time interlace 4, and no subbands are used for FSS in time interlace 5.

An FSS user may be assigned resource blocks in a desired subband in an appropriate time interlace. For the example design shown in FIG. 9A, FSS users desiring subbands 0 and 1 may be assigned resource blocks in these subbands in time interlace 0 and/or 3, FSS users desiring subbands 2 and 3 may be assigned resource blocks in these subbands in time interlace 1 and/or 4, and FSS users desiring subbands 4 and 5 may be assigned resource blocks in these subbands in time interlace 2 and/or 5. Each FSS user may thus be assigned resource block in that user's desired subband.

In general, a multiplexing structure may include any number of subbands ($N_{SB}$) and any number of time interlaces (M). Any number of subbands may be used for FSS in each time interlace. The same or different numbers of subbands may be used for FSS in the M time interlaces. For each time interlace, the subbands used for FSS may be contiguous or non-contiguous.

The subbands used for FSS and the subbands used for FDS in each time interlace may be conveyed to the users in various manners. In one design, the subbands for FSS and FDS may be selected for time interlace 0, and the subbands for FSS and FDS for each remaining time interlace are defined based on the subbands for FSS and FDS for time interlace 0. In one design, a subband bit mask may be used for time interlace 0 and may have one bit for each of the $N_{SB}$ subbands. The bit for each subband may be set to 0 to indicate that subband being used for FDS or to 1 to indicate that subband being used for FSS. The subband bit mask for each remaining time interlace may be defined based on the subband bit mask for time interlace 0. In one design, the subband bit mask for each remaining time interlace is a cyclic shift version of the subband bit mask for time interlace 0. For the example design shown in FIG. 9A with M=6 time interlaces, the subband bit mask for each time interlace may be given as follows:

Subband bit mask for time interlace 0={1,1,0,0,0,0},
Subband bit mask for time interlace 1={0,0,1,1,0,0},
Subband bit mask for time interlace 2={0,0,0,0,1,1},
Subband bit mask for time interlace 3={1,1,0,0,0,0},
Subband bit mask for time interlace 4={0,0,1,1,0,0}, and
Subband bit mask for time interlace 5={0,0,0,0,1,1}.

The subband bit masks for the time interlaces may also be defined based on some other mapping. The same subband bit mask may also be used for all time interlaces. In any case, by using a predetermined mapping for the M subband bit masks for the M time interlaces, a single subband bit mask may be sent to convey the subbands used for FSS and FDS for each of the M time interlaces. In another design, the subbands for FSS and FDS for each time interlace may be selected independently and conveyed, e.g., using a separate subband bit mask for each time interlace.

The system may support hybrid automatic retransmission (HARQ), which may also be referred to as incremental redundancy, chase combining, etc. With HARQ, a transmitter sends a transmission for a packet and may send one or more retransmissions until the packet is decoded correctly by a receiver, or the maximum number of retransmissions has been sent, or some other termination condition is encountered. HARQ may improve reliability of data transmission.

M HARQ interlaces may be defined, where M may be any integer value. Each HARQ interlace may cover time periods that are spaced apart by M time periods (not counting time allocated for overhead). As some examples, three or six HARQ interlaces may be defined as shown in FIG. 9A, or six HARQ interlaces may be defined as shown in FIG. 9B. Fewer or more HARQ interlaces may also be defined. Each HARQ interlace may correspond to a different time interlace.

An HARQ process refers to all transmission and retransmissions, if any, for a packet. An HARQ process may be started whenever resources are available and may terminate after the first transmission or after one or more subsequent retransmissions. An HARQ process may have a variable duration that may depend on the decoding results at the receiver. Each HARQ process may be sent on one HARQ interlace. An FSS user may be assigned resource blocks in an HARQ interlace having the subband desired by that user.

In general, a time period for a time interlace (e.g., in FIG. 9A or 9B) may be equal to, shorter than, or longer than a time interval for frequency hopping (e.g., in FIGS. 5 through 8). If a time period is longer than a time interval, then frequency hopping may occur within each time period. In one design, a time interval spans one symbol period, and a time period spans two slots of 12 or 14 symbol periods. In this design, frequency hopping may occur from symbol period to symbol period within each time period of two slots. In another design, a time period is equal to a time interval, both of which may be equal to a symbol period, a slot, a subframe, etc. In this design, for FSS, frequency hopping may occur from time period to time period for each time interlace. For FDS, frequency hopping may be performed separately for each time interlace or jointly across all time interlaces.

Figure 10:
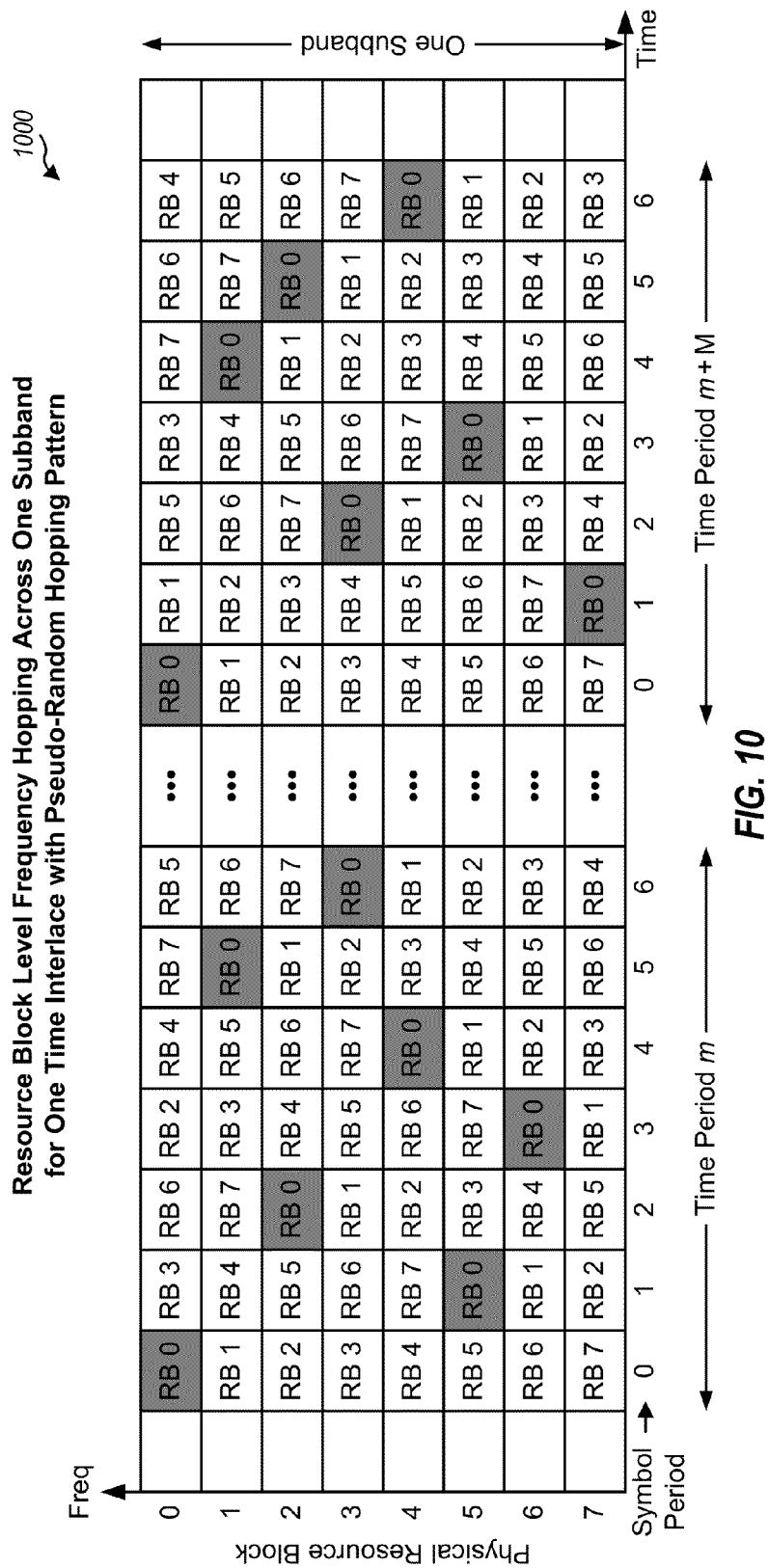
FIG. 10 shows frequency hopping across resource blocks within one subband for one time interlace.

FIG. 10 shows a design of a multiplexing structure 1000 that supports FSS with frequency hopping across resource blocks within one subband for one time interlace m. In this example design, time interlace m includes time periods m, m+M, etc., each time period corresponds to one slot, and each time interval corresponds to one symbol period.

In the example design shown in FIG. 10, the subband includes $N_{RB}$=8 physical resource blocks 0 through 7, and eight virtual resource blocks 0 through 7 are defined. Each virtual resource block is mapped to one of physical resource blocks 0 through 7 in each symbol period for time interlace m based on a pseudo-random hopping pattern. Virtual resource block 0 is mapped to physical resource block 0 in symbol period 0 of time period m, to physical resource block 5 in symbol period 1, to physical resource block 2 in symbol period 2, etc. The mapping of virtual resource blocks 0 through 7 to physical resource blocks 0 through 7 in each symbol period of time interlace m is shown in FIG. 10. FIG. 10 shows a pseudo-random hopping pattern, and other hopping patterns may also be used.

In general, various hopping patterns may be used for frequency hopping for FDS and FSS. The same hopping pattern may be used for both FDS and FSS, or different hopping patterns may be used for FDS and FSS. A hopping pattern may be a fixed hopping pattern such as a cyclic shift pattern or some other pattern. A hopping pattern may also be generated based on a known function or generator, which may receive any parameter as input or seed. In one design, a hopping pattern is used for each cell or sector in the system. Neighboring cells or sectors may use different hopping patterns to randomize inter-cell/sector interference.

In one design, the hopping pattern for each cell or sector is static in time and repeats in a predetermined time duration, e.g., a predetermined number of subframes. For example, frequency hopping may be performed for a set of Q resource blocks across 12 or 14 symbol periods in each subframe based on a fixed hopping pattern, e.g., a cyclic shift pattern. Virtual resource blocks 0 through Q−1 may be mapped to physical resource blocks 0 through Q−1, respectively, in the first symbol period of each subframe. Each virtual resource block may be mapped to a different physical resource block in each remaining symbol period of the subframe.

In another design, the hopping pattern for each cell or sector is time varying. The hopping pattern may be defined based on a known function, e.g., a function of a pseudo-random scrambling code that is specific to the cell or sector. For example, frequency hopping may be performed for a set of Q resource blocks across 12 or 14 symbol periods in each subframe based on a fixed hopping pattern, e.g., a cyclic shift pattern. However, the initial mapping for the first symbol period may be determined based on four bits of the scrambling code. For example, if the 4-bit scrambling code value is q, then for the first symbol period of the subframe, virtual resource block 0 may be mapped to physical resource block q, virtual resource block 1 may be mapped to physical resource block (q+1)mod Q, etc. The 4-bit scrambling code value may change from subframe to subframe to achieve time varying frequency hopping.

FIG. 11 shows a design of a process 1100 for sending transmissions for FSS and FDS. Process 1100 may be performed by a Node B or some other entity. A first transmission for a first user (e.g., an FSS user) may be mapped to a subband selected for the first user from among at least one subband in a first frequency region of the system bandwidth (block 1112). The first transmission may be mapped to a fixed portion (e.g., a specific resource block) of the selected subband in different time intervals. Frequency hopping within the selected subband may also be performed for the first user. In this case, the first transmission may be mapped to different portions (e.g., different resource blocks) of the selected subband in different time intervals. The first transmission may be sent in consecutive time periods or evenly spaced time periods of a time interlace.

A second transmission for a second user (e.g., an FDS user) may be mapped across multiple subbands in a second frequency region (block 1114). The first and second frequency regions may correspond to two non-overlapping portions of the system bandwidth. The multiple subbands in the second frequency region may be contiguous or non-contiguous. Frequency hopping at subband level may be performed for the second user. In this case, the second transmission may be mapped to different subbands in the second frequency region in different time intervals. Frequency hopping at resource block level may also be performed for the second user. In this case, the second transmission may be mapped to different resource blocks in the second frequency region in different time intervals. Frequency hopping at the subcarrier level may also be performed.

In general, a transmission may be mapped to different sets of subcarriers in one or multiple subbands in different time intervals with frequency hopping. The frequency hopping may be performed based on a fixed hopping pattern (e.g., a cyclic shift pattern) or a pseudo-random hopping pattern (e.g., determined based on a scrambling code). OFDM symbols or SC-FDM symbols may be generated with the first transmission mapped to the selected subband in the first frequency region and the second transmission mapped to the multiple subbands in the second frequency region (block 1116).

A user may also send a transmission on a select subband in a first frequency region for frequency selective scheduling. The user may send the transmission across multiple subbands in a second frequency region for frequency diversity scheduling.

FIG. 12 shows a design of an apparatus 1200 for sending transmissions for FSS and FDS. Apparatus 1200 includes means for mapping a first transmission for a first user to a subband selected for the first user from among at least one subband in a first frequency region of the system bandwidth (module 1212), means for mapping a second transmission for a second user across multiple subbands in a second frequency region of the system bandwidth (module 1214), and means for generating OFDM symbols or SC-FDM symbols with the first transmission mapped to the selected subband in the first frequency region and the second transmission mapped to the multiple subbands in the second frequency region (module 1216).

Figure 13:
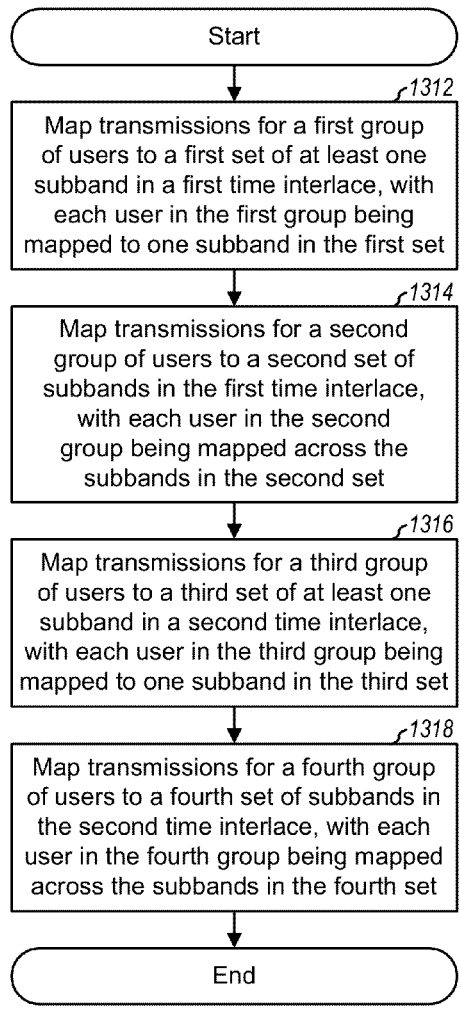
FIGS. 13 and 14 show a process and an apparatus, respectively, for sending transmissions for FSS and FDS users on time interlaces.

FIG. 13 shows a design of a process 1300 for sending transmissions for FSS and FDS. Process 1300 may be performed by a Node B or some other entity. Transmissions for a first group of users may be mapped to a first set of at least one subband in a first time interlace, with each user in the first group being mapped to one subband in the first set (block 1312). The first time interlace may include evenly space time periods. Transmissions for a second group of users may be mapped to a second set of subbands in the first time interlace, with each user in the second group being mapped across the subbands in the second set (block 1314). The second set may include subbands not included in the first set.

Transmissions for a third group of users may be mapped to a third set of at least one subband in a second time interlace, with each user in the third group being mapped to one subband in the third set (block 1316). The third subband set may be the same as or different from the first subband set. The second time interlace may include evenly spaced time periods not included in the first time interlace. Transmissions for a fourth group of users may be mapped to a fourth set of subbands in the second time interlace, with each user in the fourth group being mapped across the subbands in the fourth set (block 1318). The fourth set may include subbands not included in the third set. Transmissions may be sent on additional time interlaces in similar manner. The transmissions for each group of users may be sent with HARQ on the time interlace for that group.

The system bandwidth may be partitioned into subband sets used for FSS and subband sets used for FDS based on the traffic load of FSS users and the traffic load of FDS users. Information conveying the subbands in each set may be broadcast to the users or sent in other manners. This information may be provided via one or more subband bit masks, e.g., one subband bit mask for the first time interlace, one subband bit mask for each time interlace, etc.

Figure 14:
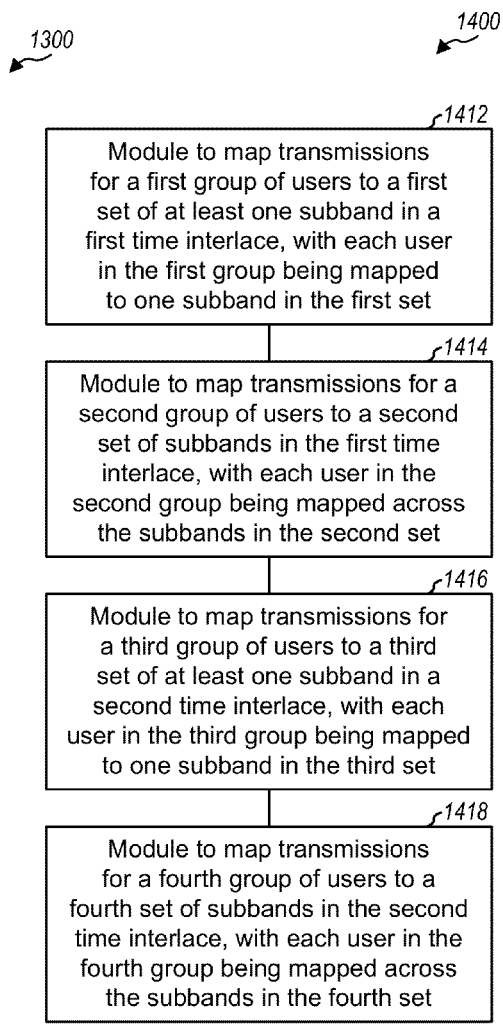

FIG. 14 shows a design of an apparatus 1400 for sending transmissions for FSS and FDS. Apparatus 1400 includes means for mapping transmissions for a first group of users to a first set of at least one subband in a first time interlace, with each user in the first group being mapped to one subband in the first set (module 1412), means for mapping transmissions for a second group of users to a second set of subbands in the first time interlace, with each user in the second group mapped across the subbands in the second set (module 1414), means for mapping transmissions for a third group of users to a third set of at least one subband in a second time interlace, with each user in the third group being mapped to one subband in the third set (module 1416), and means for mapping transmissions for a fourth group of users to a fourth set of subbands in the second time interlace, with each user in the fourth group being mapped across the subbands in the fourth set (module 1418).

FIG. 15 shows a design of a process 1500 for receiving transmission. Process 1500 may be performed by a UE or some other entity. A transmission may be received from a subband selected from among at least one subband in a first frequency region of the system bandwidth if the transmission is sent with frequency selective scheduling (block 1512). The transmission may be received from a fixed portion (e.g., a specific resource block) of the selected subband in different time intervals. The transmission may also be received from different portions (e.g., different resource blocks) of the selected subband in different time intervals if sent with frequency hopping.

The transmission may be received from across multiple subbands in a second frequency region of the system bandwidth if the transmission is sent with frequency diversity scheduling (block 1514). The transmission may be received from different subbands in the second frequency region in different time intervals if sent with subband level frequency hopping. The transmission may also be received from different resource blocks in the second frequency region in different time intervals if sent with resource block level frequency hopping. The transmission may be received based on a fixed hopping pattern (e.g., a cyclic shift pattern) or a pseudo-random hopping pattern if sent with frequency hopping. The transmission may also be received in evenly spaced time periods, e.g., with HARQ. The subbands in the first and second frequency regions may be determined based on broadcast information, signaling, etc.

FIG. 16 shows a design of a process 1600 for receiving transmission. Apparatus 1600 includes means for receiving a transmission from a subband selected from among at least one subband in a first frequency region of the system bandwidth if the transmission is sent with frequency selective scheduling (module 1612) and means for receiving the transmission from across multiple subbands in a second frequency region of the system bandwidth if the transmission is sent with frequency diversity scheduling (module 1614).

The modules in FIGS. 12, 14 and 16 may comprise processors, electronics devices, hardware devices, electronics components, logical circuits, memories, etc., or any combination thereof.

Figure 17:
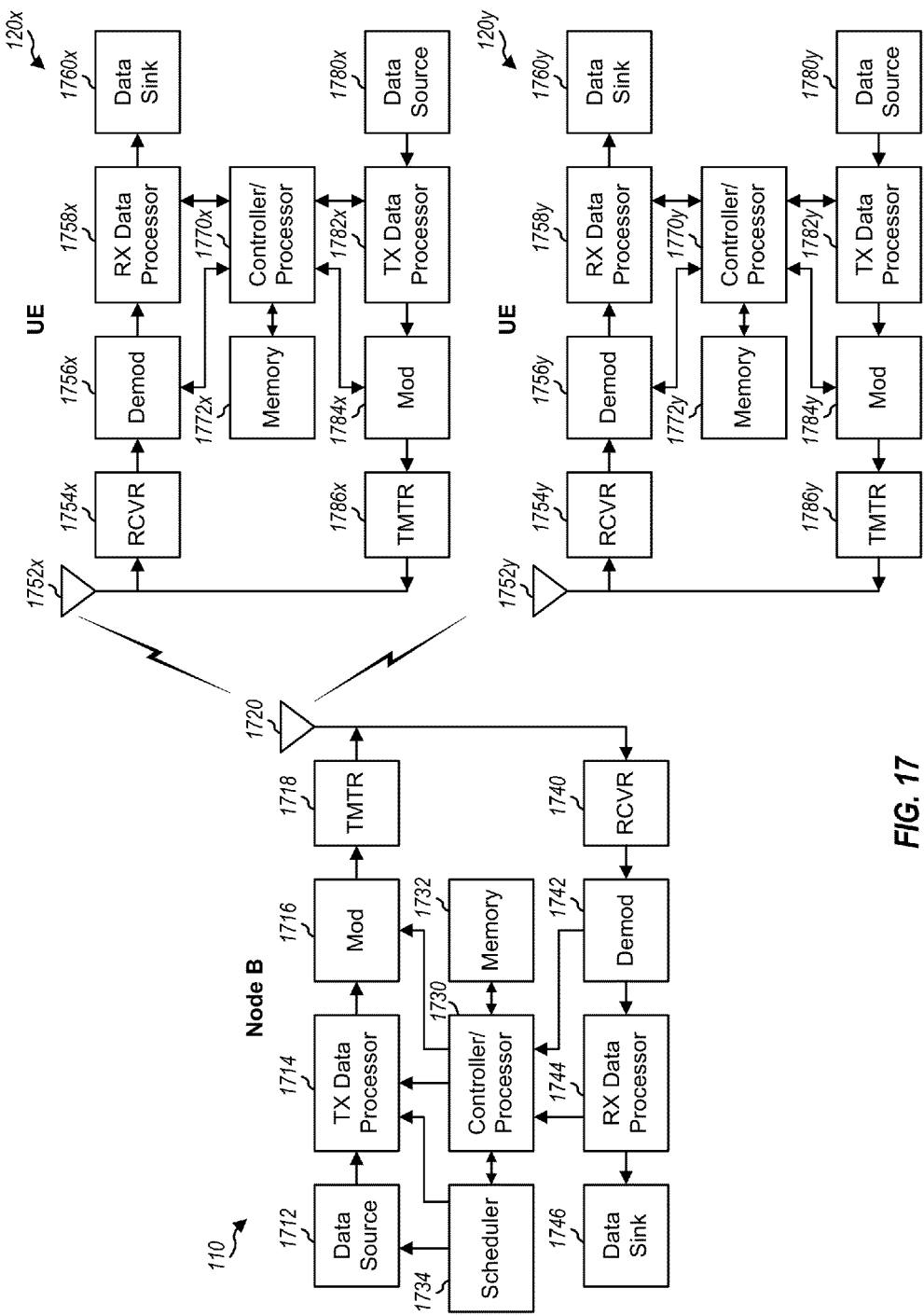
FIG. 17 shows a block diagram of a Node B and two user equipments (UEs).

FIG. 17 shows a block diagram of a design of a Node B 110 and two UEs 120x and 120y, which are one of the Node Bs and two of the UEs in FIG. 1. At Node B 110, a transmit (TX) data processor 1714 may receive traffic data from a data source 1712 and/or signaling from a controller/processor 1730 and a scheduler 1734. TX data processor 1714 may process (e.g., encode, interleave, and symbol map) the traffic data and signaling and provide data symbols and signaling symbols, respectively. A modulator (Mod) 1716 may multiplex pilot symbols with the data and signaling symbols, perform modulation on the multiplexed symbols (e.g., for OFDM), and provide output chips. A transmitter (TMTR) 1718 may process (e.g., convert to analog, amplify, filter, and frequency upconvert) the output chips and generate a downlink signal, which may be transmitted via an antenna 1720.

At each UE 120, an antenna 1752 may receive the downlink signals from Node B 110 and other Node Bs. A receiver (RCVR) 1754 may condition (e.g., filter, amplify, frequency downconvert, and digitize) a received signal from antenna 1752 and provide samples. A demodulator (Demod) 1756 may perform demodulation on the samples (e.g., for OFDM) and provide symbol estimates. A receive (RX) data processor 1758 may process (e.g., symbol demap, deinterleave, and decode) the symbol estimates, provide decoded data to a data sink 1760, and provide detected signaling to a controller/processor 1770. In general, the processing by RX data processor 1758 and demodulator 1756 at each UE 120 is complementary to the processing by TX data processor 1714 and modulator 1716, respectively, at Node B 110.

On the uplink, a TX data processor 1782 may process traffic data from a data source 1780 and/or signaling from controller/processor 1770 and generate data and signaling symbols, respectively. These symbols may be modulated by a modulator 1784 and conditioned by a transmitter 1786 to generate an uplink signal, which may be transmitted via antenna 1752. At Node B 110, the uplink signals from UEs 120x and 120y and other UEs may be received by antenna 1720, conditioned by a receiver 1740, demodulated by a demodulator 1742, and processed by an RX data processor 1744. Processor 1744 may provide decoded data to a data sink 1746 and detected signaling to controller/processor 1730.

Controllers/processors 1730, 1770x and 1770y may direct the operation at Node B 110 and UEs 120x and 120y, respectively. Memories 1732, 1772x and 1772y may store data and program codes for Node B 110 and UEs 120x and 120y, respectively. Scheduler 1734 may schedule UEs for communication with Node B 110. Scheduler 1734 and/or controller/processor 1730 may identify UEs to be scheduled with FDS and UEs to be scheduled with FSS and may assign resource blocks in the appropriate subbands to these UEs. Scheduler 1734 and/or controller/processor 1730 may perform process 1100 in FIG. 11, process 1300 in FIG. 13, and/or other processes for transmission to the UEs. Controllers/processors 1770x and 1770y at UEs 120x and 120y, respectively, may perform process 1500 in FIG. 15 and/or other processes to receive and/or send transmissions for these UEs.

The transmission techniques described herein may be implemented by various means. For example, these techniques may be implemented in hardware, firmware, software, or a combination thereof. For a hardware implementation, the processing units used to perform the techniques at an entity (e.g., a Node B or a UE) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory 1732, 1772x or 1772y in FIG. 17) and executed by a processor (e.g., processor 1730, 1770x or 1770y). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining a first frequency region designated for frequency selective scheduling and a second frequency region designated for frequency diversity scheduling, the first and second frequency regions corresponding to two non-overlapping portions of system bandwidth;
   receiving a transmission from a subband selected from among at least one subband in the first frequency region if the transmission is sent with frequency selective scheduling; and
   receiving the transmission from across multiple subbands in the second frequency region if the transmission is sent with frequency diversity scheduling.

2. The method of claim 1, wherein the receiving the transmission from a subband comprises receiving the transmission from a fixed portion of the subband in different time intervals if the transmission is sent with frequency selective scheduling.

3. The method of claim 1, wherein the receiving the transmission from a subband comprises receiving the transmission from different portions of the subband in different time intervals if the transmission is sent with frequency selective scheduling.

4. The method of claim 1, wherein the receiving the transmission from across multiple subbands comprises receiving the transmission from different subbands in the second frequency region in different time intervals if the transmission is sent with frequency diversity scheduling.

5. The method of claim 1, wherein each subband comprises multiple resource blocks, and wherein the receiving the transmission from across multiple subbands comprises receiving the transmission from different resource blocks in the second frequency region in different time intervals if the transmission is sent with frequency diversity scheduling.

6. The method of claim 1, wherein the receiving the transmission from across multiple subbands comprises receiving the transmission based on a fixed hopping pattern or a pseudo-random hopping pattern used to send the transmission with frequency hopping.

7. The method of claim 1, wherein the transmission is received in evenly spaced time periods with hybrid automatic retransmission (HARQ).

8. The method of claim 1, further comprising:
receiving broadcast information indicative of the subbands in the first and second frequency regions.

9. The method of claim 1, wherein the multiple subbands in the second frequency region are non-contiguous.

10. The method of claim 1, wherein the transmission comprises orthogonal frequency division multiplexing (OFDM) symbols.

11. An apparatus for wireless communication, comprising:
means for determining a first frequency region designated for frequency selective scheduling and a second frequency region designated for frequency diversity scheduling, the first and second frequency regions corresponding to two non-overlapping portions of system bandwidth;
means for receiving a transmission from a subband selected from among at least one subband in the first frequency region if the transmission is sent with frequency selective scheduling; and
means for receiving the transmission from across multiple subbands in the second frequency region if the transmission is sent with frequency diversity scheduling.

12. The apparatus of claim 11, wherein the means for receiving the transmission from a subband comprises means for receiving the transmission from a fixed portion of the subband in different time intervals if the transmission is sent with frequency selective scheduling.

13. The apparatus of claim 11, wherein the means for receiving the transmission from a subband comprises means for receiving the transmission from different portions of the subband in different time intervals if the transmission is sent with frequency selective scheduling.

14. The apparatus of claim 11, wherein the means for receiving the transmission from across multiple subbands comprises means for receiving the transmission from different subbands in the second frequency region in different time intervals if the transmission is sent with frequency diversity scheduling.

15. The apparatus of claim 11, wherein each subband comprises multiple resource blocks, and wherein the means for receiving the transmission from across multiple subbands comprises means for receiving the transmission from different resource blocks in the second frequency region in different time intervals if the transmission is sent with frequency diversity scheduling.

16. The apparatus of claim 11, wherein the means for receiving the transmission from across multiple subbands comprises means for receiving the transmission based on a fixed hopping pattern or a pseudo-random hopping pattern used to send the transmission with frequency hopping.

17. An apparatus for wireless communication, comprising:
a controller configured to determine a first frequency region designated for frequency selective scheduling and a second frequency region designated for frequency diversity scheduling, the first and second frequency regions corresponding to two non-overlapping portions of system bandwidth; and
a demodulator configured to receive a transmission from a subband selected from among at least one subband in the first frequency region if the transmission is sent with frequency selective scheduling and to receive the transmission from across multiple subbands in the second frequency region if the transmission is sent with frequency diversity scheduling.

18. The apparatus of claim 17, wherein the demodulator is configured to receive the transmission from a fixed portion of the selected subband in different time intervals if the transmission is sent with frequency selective scheduling.

19. The apparatus of claim 17, wherein the demodulator is configured to receive the transmission from different portions of the selected subband in different time intervals if the transmission is sent with frequency selective scheduling.

20. The apparatus of claim 17, wherein the demodulator is configured to receive the transmission from different subbands in the second frequency region in different time intervals if the transmission is sent with frequency diversity scheduling.

21. The apparatus of claim 17, wherein each subband comprises multiple resource blocks, and wherein the demodulator is configured to receive the transmission from different resource blocks in the second frequency region in different time intervals if the transmission is sent with frequency diversity scheduling.

22. The apparatus of claim 17, wherein the demodulator is configured to receive the transmission based on a fixed hopping pattern or a pseudo-random hopping pattern used to send the transmission with frequency hopping.

23. A computer program product, comprising:
a non-transitory computer-readable medium comprising:
code for causing at least one processor to determine a first frequency region designated for frequency selective scheduling and a second frequency region designated for frequency diversity scheduling, the first and second frequency regions corresponding to two non-overlapping portions of system bandwidth;
code for causing the at least one processor to receive a transmission from a subband selected from among at least one subband in the first frequency region if the transmission is sent with frequency selective scheduling; and
code for causing the at least one processor to receive the transmission from across multiple subbands in the second frequency region if the transmission is sent with frequency diversity scheduling.

\* \* \* \* \*